US012234113B2

(12) United States Patent
Hopper et al.

(10) Patent No.: US 12,234,113 B2
(45) Date of Patent: Feb. 25, 2025

(54) SPLICE INTERRUPT MECHANISM

(71) Applicants: Samuel Hopper, Boulder, CO (US); Scott R. Johnson, Boulder, CO (US); Walter F. Kailey, Boulder, CO (US); Michael McDermott, Boulder, CO (US)

(72) Inventors: Samuel Hopper, Boulder, CO (US); Scott R. Johnson, Boulder, CO (US); Walter F. Kailey, Boulder, CO (US); Michael McDermott, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 18/179,500

(22) Filed: Mar. 7, 2023

(65) Prior Publication Data

US 2024/0300764 A1 Sep. 12, 2024

(51) Int. Cl.
*B65H 21/00* (2006.01)
*B41J 3/60* (2006.01)
(Continued)

(52) U.S. Cl.
CPC ................ *B65H 21/00* (2013.01); *B41J 3/60* (2013.01); *B41J 11/008* (2013.01); *B41J 29/26* (2013.01);
(Continued)

(58) Field of Classification Search
CPC ........ B65H 21/00; B65H 2551/20; B41J 3/60; B41J 11/008; B41J 29/26; B41J 29/393
See application file for complete search history.

(56) References Cited

U.S. PATENT DOCUMENTS 8,099,009 B2 1/2012 Young et al.
8,339,660 B2 12/2012 Kageyama et al.
(Continued)

FOREIGN PATENT DOCUMENTS

WO 2021183742 A1 9/2021

OTHER PUBLICATIONS

FujiFilm 42K Printbar System: Features, Aug. 18, 2022, 4 pages. downloaded from https://www.fujifilm.com/us/en/business/inkjet-solutions/technology-integration/42k-printbar-system/features.

*Primary Examiner* — Bradley W Thies
(74) *Attorney, Agent, or Firm* — Jaffery Watson Hamilton & DeSanctis LLP

(57) ABSTRACT

A system is disclosed. The system comprises one or more print controllers to generate print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at the first print engine and to open a second printhead gap at the second print engine, control printing of the first side sheet image on a first side of a web at a first print engine based on the print interrupt instructions, control printing of the second side sheet image to a second side of the web at a second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

20 Claims, 12 Drawing Sheets

(51) Int. Cl.
*B41J 11/00* (2006.01)
*B41J 29/26* (2006.01)
*B41J 29/393* (2006.01)

(52) U.S. Cl.
CPC ......... *B41J 29/393* (2013.01); *B65H 2551/20* (2013.01)

(56) References Cited

U.S. PATENT DOCUMENTS

| | | | |
|---|---|---|---|
| 8,355,159 B2 | 1/2013 | Dobbertin et al. | |
| 8,757,746 B2 | 6/2014 | Wing et al. | |
| 8,757,757 B2 | 6/2014 | Takeuchi et al. | |
| 9,102,143 B2 | 8/2015 | Araki | |
| 9,815,307 B2 | 11/2017 | Mueller et al. | |
| 11,241,898 B2 | 2/2022 | Lang | |
| 2011/0279510 A1* | 11/2011 | Takeuchi | B41J 11/70 347/16 |
| 2015/0116395 A1 | 4/2015 | Schelmbauer | |

* cited by examiner

SPLICE INTERRUPT MECHANISM

FIELD OF THE INVENTION

The invention relates to the field of image reproduction, and in particular, imaging systems having multiple print engines for processing print media.

BACKGROUND

Entities with substantial printing demands typically implement a high-speed production printer for volume printing (e.g., one hundred pages per minute or more). Production printers may include continuous-forms printers that print on a long web of print medium (e.g., paper) stored on a large roll. A production printer typically includes a localized print controller that controls the overall operation of the printing system, and one or more print engines that include one or more printhead assemblies, where each printhead assembly includes an array of printheads. Each print engine may be three meters or more in length. Each printhead comprises many nozzles (e.g., inkjet nozzles) for the ejection of ink or any marking material suitable for printing on a print medium.

In one embodiment, a system is disclosed. The system includes one or more print controllers to generate print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at the first print engine and to open a second printhead gap at the second print engine, control printing of the first side sheet image on a first side of a web at a first print engine based on the print interrupt instructions, control printing of the second side sheet image to a second side of the web at a second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

BRIEF DESCRIPTION OF THE DRAWINGS

A better understanding of the present invention can be obtained from the following detailed description in conjunction with the following drawings, in which.

DETAILED DESCRIPTION

Figure 1:
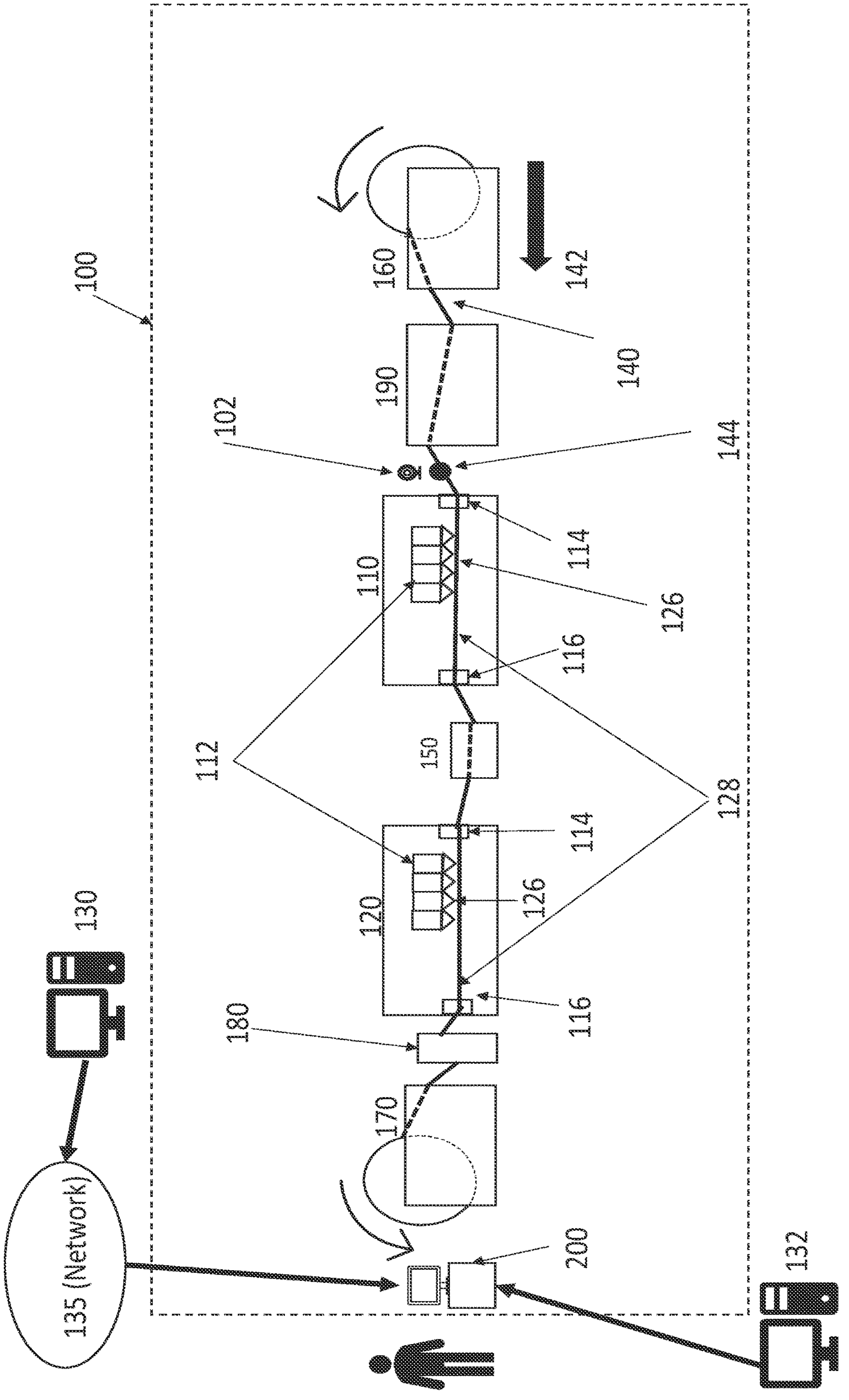
FIG. 1 is a block diagram illustrating one embodiment of a printing system.

Full duplex production printers typically implement one or more engine controllers to control two print engines that each print on an opposing side (e.g., two sided) of the moving paper web. Each print engine receives bitmaps (e.g., sheetside bitmaps) that are generated at the print controller. The sheetside bitmaps correspond to printed sheets or pages. Specifically, the engine controllers request specific bitmaps in advance of when they are needed and buffer the bitmaps until they are processed by the print engine hardware, where the page buffer for the first print engine includes a different set of bitmaps than the page buffer for the second print engine.

At some time during printing, a splice (e.g., a joint) across a section of the print media web may be present. Splices may occur almost anywhere in the length of the web media, especially with low-cost media due to web media manufacturing parameters. Splices may also be applied to paper within a print shop to connect a first roll of paper to a second roll whenever the paper in the first roll of a print system is diminishing (or running out). Machinery exists to purposely create splices between the end of a first paper roll and the beginning of a second paper roll, even while the paper is moving. However, a splice may damage sensitive physical components (e.g., inkjet nozzles) of the printer as it passes through the print engines due to the thickness of the splice being greater than the thickness of the paper. Thus, the sensitive areas of the printer in the paper path need to be protected from damage due to the splice. For example, the printheads of the print engines may be protected from the splice by increasing the distance between the printhead nozzle surfaces and the surface of the paper (or similarly, increasing the distance between the printhead nozzle surface and the surfaces that support the paper in the area of the printhead nozzle surface). Increasing this distance may be called opening the printhead gap. By doing this, the splice may physically pass through the paper path of the print engines without obstruction or damage to either the print engine or even the paper itself.

Opening the printhead gap may be done with print system gap mechanisms that perform lifting (or removing) the printheads sufficiently away from the paper surface or alternatively lowering the paper sufficiently away from the surfaces of the printheads prior to the splice reaching the printheads along the paper path in each print engine. With the printhead gap open, normal printing is not possible due to the larger printhead gap distance amount and so printing (e.g., ejecting marking material onto the paper 140) is stopped with the printhead gap open. However, an open print gap allows the paper, including the splice, to move along the paper path in the print engines without risk of damage.

Printing may resume once the splice has exited the last of the print engines and the printhead gaps are closed (e.g., the printhead gap is moved to a distance amount suitable for printing by reversing the steps taken to open the printhead gaps). While control to set the printhead gap to two different distances are mentioned here, control for setting the printhead gap distances to more than two amounts is allowed. The mechanisms to open or close the printhead gaps may be implemented within the first print engine and the second print engine.

However, jet-outs (e.g., clogging of nozzles attributed to the nozzles being idle for too long while uncapped) in inkjet printers may occur due to the period of interrupted printing as the splice is passing the printheads. Therefore, immediately prior to resuming printing of a print job (e.g., production printing), flushing sheets are printed to prepare the nozzles for resuming production printing. Also, since there is a variable-time, fixed paper-length delay between first engine and second engine, the flushing sheets must be printed at each engine at different times. Production printing then resumes first on the first print engine and, later, on the second print engine, after the splice interruption delay.

Coordinating all of the above-described actions with two print engines with the proper timing continues to be inefficiently executed in current printing systems. For example, conventional splice processing in production printers may result in undesirable events such as: cancelled sheets in the engine buffers, sheets inked on one side but not on the other, partially printed sheet sides, duplicate printed sheets when printing is resumed, resumption of printing with an incorrect sheet, excessive amount of unprinted paper or manual operator intervention. In some cases, the response of conventional print systems to splices is to cause the print controller to re-process (e.g., re-rasterize) at least a portion of a print job. Having to re-process print jobs is inefficient (e.g., wasted time and/or wasted printed paper) and complex to implement.

In production printers, splices may be present across a section of the print media web and may damage the printer or the paper web when the splice passes through sensitive areas of the printer along the paper path due to the splice thickness being larger than the paper web thickness. Conventional methods to handle splice advancement through a printer are inefficient or time consuming. Accordingly, an efficient splice interruption control is desired.

According to one embodiment, a mechanism to perform splice interruptions in a printing system is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

FIG. 1 is a block diagram illustrating one embodiment of a printing system 100. As shown in FIG. 1, printing system 100 comprises a tandem duplex continuous-forms printer 100 mainly comprises a first print engine 110, a second print engine 120, and a printer controller 200. The first print engine 110 and second print engine 120 each have respective entrance 114, exit 116, one or more printheads 112, etc. Paper supply unit 160 supplies paper 140 (e.g., a continuous form print medium also known as a web) to print system and is typically a paper roll unwinder that unwinds the paper from a large roll. Paper 140 exits paper supply 160 and is fed into the entrance of splicing unit 190. When the paper roll in paper supply 160 is near an end, splicing unit 190 responds by applying a splice between a section of paper from a first roll that is near to empty and a second roll that is full. The second paper roll may be part of paper supply 160 or splicing unit 190.

Further, paper supply 160 and/or splicing unit 190 may contain web buffers (e.g., web festoons) that store lengths of paper 140 (e.g., web). One use of a web buffer is to increase the time from detection of a splice 144 to the time that the splice 144 reaches the entrance 114 of first print engine 120 by storing a known web length amount and locating a sensor to detect the splice upstream of the web buffer. The stored web length amount may be constant and fixed or otherwise identified at the time of the detection of a splice 144 by the sensor.

In other embodiments, the functions of paper supply 160 and splicing unit 190 may be combined into one device. Paper 140 exits splicing unit 190 and is fed into the entrance 114 of print engine and advances through the print engine 110 along the paper path 128, past printheads 112 and out of the exit 116. Other components of the print engines 110 and 120, such as paper rollers, paper guides, paper drive mechanisms, paper tensioners and dryers, are not shown for brevity. Besides a continuous form rolled format, paper 140 may be a folded type of continuous paper may alternatively be supplied to the first print engine 110.

Paper 140 may include one or more splices 144 fixed in one or more sections of the paper 140. Paper 140 generally proceeds in the paper processing direction 142 while printing. Paper path 128 is the physical path the paper 140, in a taut (e.g., tight) state, takes as it progresses starting at paper supply unit 160 and finishing at post-processing device 170 and includes the path within all the devices in between. Printheads 112 include one or more pel forming elements that directly or indirectly (e.g., by transfer of marking material through an intermediary) forms the representation of picture elements (pels) on the paper 140 (e.g., the print medium) with marking material applied to the paper 140.

In an ink jet printer, a pel forming element is a tangible device that ejects the ink onto paper (e.g., an ink jet nozzle) and, in an electro-photographic (EP) printer the pel forming element may be a tangible device that determines the location of toner particles printed on the print medium (e.g., an EP exposure LED or an EP exposure laser). Further, the pel forming elements may be assigned to one of one or more color planes that correspond to types of marking materials (e.g., Cyan, Magenta, Yellow, and blacK (CMYK)). The space between the nozzle surface of printhead 112 and surface of paper 140 (or the surface of splice 144) that faces away from the nozzle surface of printhead 112 is printhead gap 126.

The paper 140 is fed through a turning device at the output of the first printer so that the second printer prints on the reverse side of the first printer's output. The function of the respective units of the entrance 114, exit 116, one or more printheads 112, etc. in the second print engine 120 is the same as those of the first print engine 110. The printer controller 20 receives print data from upper-level computers 130, 132, etc., and after carrying out a drawing process, outputs image data to the first print engine 110 and the second print engine 120.

The printer controller 200 is provided with a print mode setting unit 2610 that enables the setting of the print mode, such as the tandem duplex print mode. This print mode setting unit 2610 shall be described later using FIG. 2. In order to realize tandem duplex printing using the first print engine 110 and the second print engine 120, a paper inverting unit 150, are added.

The computer 130 is connected to the printer controller 200 via a network 135. Network 135 may be LAN, WAN or cloud. The computer 132 is connected to the printer controller 200 via a local interface. Physically, the local interface is realized as a printer local I/F cable. In the tandem duplex print mode, the paper inverting unit 150 inverts the printing surfaces of paper 140, on a first surface of which printing has been performed by the first print engine 110, and outputs the paper 140 from the exit 116 to the second print engine 120. In the tandem single-side print mode, the paper 140 is passed through the paper inverting unit 150 without being inverted. The second print engine 120 receives the paper 140 that has been conveyed through the paper inverting unit 150 at entrance 114 in second print engine 120. The paper path mechanisms (not shown) advance the paper 140 along the paper path 128 to the printing processes of the printhead 112, etc., of the second print engine 120.

Thus, by the use of the paper inverting unit 150, printing by the first printer engine 110 is carried out first and then printing by the second print engine 120 is carried out to realize tandem duplex printing. The paper 140 that has been printed on by the second print engine 120 is output through the exit 116 to verification unit 180 or a post-processing device 170 in accordance with the paper loading performed by an operator. Post-processing device 170 may be a paper roll re-winder or a sheet cutter with sheet stacker. The output to a paper roll re-winder type post-processing device 170 is especially effective when a paper roll unwinder type paper supply unit 160 is used as the paper supply for the first print engine 110.

The two print modes consisting of the tandem duplex print mode, and tandem single-side print mode, are prepared in the tandem continuous paper printer. The operator can set one of these modes using the print mode setting unit 2610. Both the tandem duplex print mode and the tandem single-side print mode are modes in which printing is carried out by a tandem arrangement. Tandem single-side print mode can be called tandem simplex mode as another term.

In the tandem duplex print mode, after printing on the front surface is performed by the first print engine 110, the paper 140 is inverted by the paper inverting unit 150 and then supplied to the second print engine 120. The second print engine 120 performs printing on the back surface of the inverted paper 140. In other words, second print engine 120 performs printing on the opposite side of paper 140 that first print engine 110 printed. In the tandem single-side print mode, after printing on the front surface is performed by the first print engine 110, the paper inverting unit 150 supplies the paper 140 as it is without inversion to the second print engine 120. In print system 100, paper 140 may be allowed to stay not inverted by either bypassing paper inverter unit 150 or removing paper inverter unit 150 from print system 100. Thus as with the first print engine 110, the second print engine 120 also performs printing on the front surface of the paper 140. This mode is useful for spot color printing or more generally for printing with marking materials that are not available in the first print engine 120.

Figure 2:
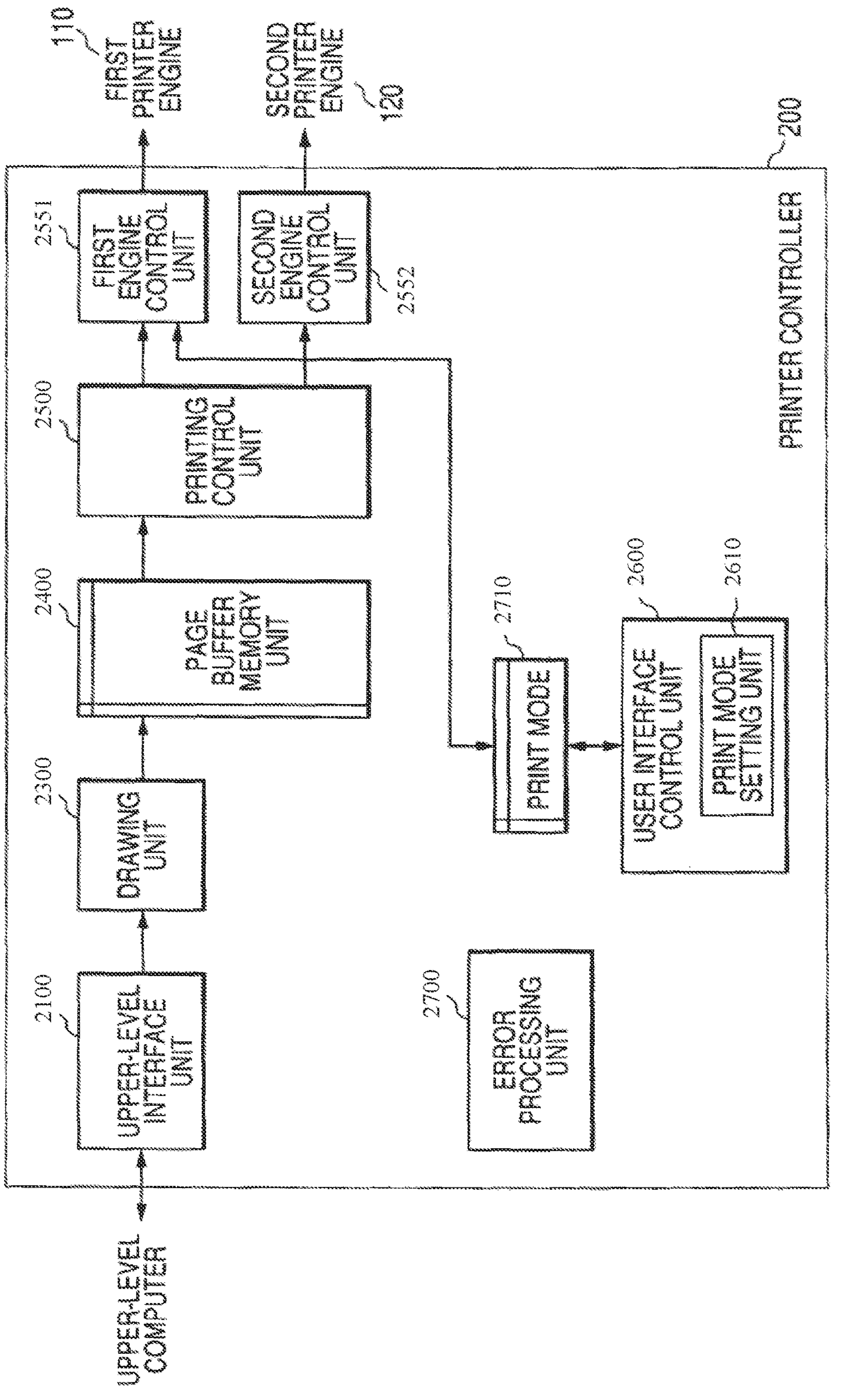
FIG. 2 is a block diagram illustrating one embodiment of a print controller.

FIG. 2 illustrates one embodiment of a print controller 200 (also known as printer controller). As shown in FIG. 2, the printer controller 200 is provided with an upper-level interface unit 2100, a drawing unit 2300, a printing control unit 2500, the user interface control unit 2600, a first engine control unit 2551, a second engine control unit 2552, and an error processing unit 2700 as the respective processing units. For storage of various types of data, the printer controller 200 is provided with a page buffer memory unit 2400 and a print mode 2710.

The upper-level interface unit 2100 shall be described first. The upper-level interface unit 2100 receives print data from the upper-level computers using various interfaces, such as the network, local interface.

Here, the print data take the form of a print command sequence, page description language, or other form that can be processed by the drawing unit 2300. Examples of print command sequence and page description language include PostScript (registered trademark), PDF (Portable Document Format; registered trademark), and TIFF (Tagged Image File Format; registered trademark) of Adobe Systems Inc., PCL-5, PCL-5E, PCL-6, and PCL-XL (registered trademarks) of Hewlett-Packard Co., JPEG, etc. With the first embodiment, any one or more of these PDL's can be supported.

With the first embodiment, Ethernet (registered trademark). Token-Ring, FDDI (Fiber Distributed Data Interface), ATM (Asynchronous Transfer Mode), ISDN (Integrated Services Digital Network), ADSL, wireless LAN (IEEE802.11a, IEEE802.11b, IEEE802.1g, etc.). Bluetooth, etc., are used as the physical I/F of the network. Also as the local interface, Centronix, SCSI, fiber channel, IEEE1394, USB, RS-232C, RS-422/423, etc., are used.

The drawing unit 2300 inputs the print data from the upper-level interface unit 2100, performs drawing, that is, the dot expansion of each character element, graphics element, and image element that makes up the print data into a sheet bitmap (or bitmap) format, writes and outputs the bitmap data into the page buffer memory unit 2400. The page buffer memory unit 2400 is arranged to store the bitmap data for a plurality of pages.

The paper size managed by the page buffer memory unit 2400 is set to the size of the paper 140 handled by the first print engine 110 and the second print engine 120. Since this paper size is the size of the actual physical paper, it shall also be referred to as the "physical paper size." This paper 140 shall also be referred to as the "physical paper" Though the drawing unit 2300 processes the input print data and outputs the data in the bitmap format, the paper size handled by the drawing unit 2300 is made independent of the physical paper size. That is, this paper size does not necessarily have to match the physical paper size. This paper size, which is prepared by the drawing unit 2300 in accordance with the print data, shall be referred to as the logical paper size. A document of the logical paper size is embedded and printed in the physical paper size. If necessary, the post-processing device 170 is provided at a stage subsequent the second print engine 120, and rewinds the printed paper 140 or may provide cutting/slitting functions where the logical paper size is cut out from the physical paper size to complete the printed matter.

The physical paper size is defined by the combination of the paper width and the paper length. The operator inputs this combination from the user interface control unit 2600 and registers it as the physical paper size. Of the physical paper size, the region in which a print engine can actually print shall be referred to as the "printable region." The paper width within which printing can be performed is the printable paper width.

The printing control unit 2500 instructs the first engine control unit 2551 or the second engine control unit 2552 to read the bitmap data of each page in the page buffer memory unit 2400 and output the data to the corresponding first print engine 110 or the second print engine 120. In accordance with this instruction, the first engine control unit 4551 reads the bitmap format data of the corresponding page in the page buffer memory unit 2400 and outputs the data to the first print engine 110. Consequently, the printing by the first print engine 110 is performed.

The second engine control unit 2552 reads the bitmap format data of the corresponding page in the page buffer memory unit 2400 and outputs the data to the second print engine 120. Consequently, the printing by the second print engine 120 is performed. The user interface control unit 2600 performs the receiving of inputs made by the operator, display of the states concerning the printer controller 200, etc. The print mode setting unit 2610 is provided in the user interface control unit 2600. By this print mode setting unit 2610, the operator can select between the tandem duplex print mode and the tandem single-side print mode, as the print mode 2710 of the tandem continuous paper printer 100.

In the cases of the tandem duplex print mode and the tandem single-side print mode, the tandem continuous paper printer 100 performs printing. In the independent two-engine single-side print mode, each of the first print engine 110 and the second print engine 120 performs single-side printing of separate print jobs independently of the other. In the single-engine single-side print mode, just the second print engine 120 is used to perform single-side printing.

The error processing unit 2700 executes individual error processes on respective errors detected by the printer controller 200. The page buffer memory unit 2400 and the print mode 2710 are storage units. In order to clearly indicate that these are storage units, these are expressed using double lines as in FIG. 2. The print mode 2710 is a facility for storing the print mode. The print mode that is set is stored in the print mode 2710 and processes are carried out in the printer controller 200 upon referencing the value in the print mode 2710.

As discussed above, the paper 140 may include splices 144 that are used to maintain a continuous supply of paper 140 into the first print engine 110 and second print engine 120, however the splices 144 may cause damage to print engines 110 and 120. Thus, an operation is performed to open the printhead gap 126 prior to the splice 144 reaching the printheads 112 until the splice 144 has passed the corresponding printheads 112. Subsequently, an operation is performed to resume printing by generating one or more flushing sheets that are inserted into the sheet queue 310A-310B prior to the next production print sheet to be printed once printing resumes, closing the printhead gap 126 and resuming printing by first printing the one or more flushing sheets. As mentioned above, current systems are unable to coordinate these operations without having to re-process at least a portion of a print job.

According to one embodiment, one or more print controllers 200 generate print interrupt instructions in response to receiving a web splice signal indicating that a splice 144 on a web print medium has been detected at a location along the web print medium upstream to the printheads 112. In such an embodiment, the print interrupt instructions indicate a first side sheet image and a second side sheet image within a print job to print prior to stopping printing. The one or more print controllers 200 control printing of the first side sheet image on a first side of a web at the first print engine 110 based on the print interrupt instructions.

In a further embodiment, the one or more print controllers 200 control printing of the second side sheet image to a second side of the web at the second print engine 120 based on the print interrupt instructions. In yet a further embodiment, the print interrupt instructions are generated based on a determination of a last first side sheet image that may be printed prior to the web splice 144 being received at the first print engine 110.

Figure 3:
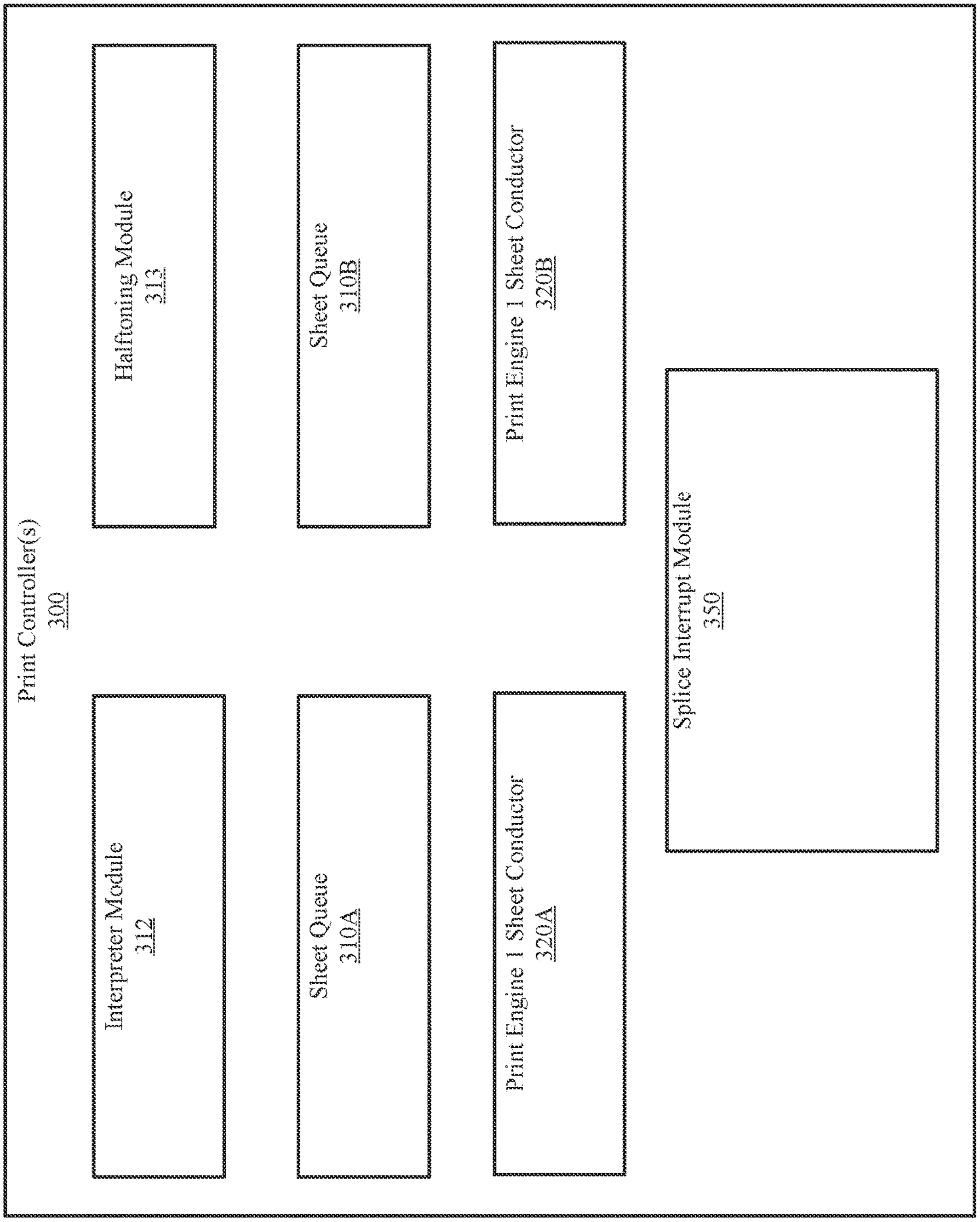
FIG. 3 is a block diagram illustrating another embodiment of a print controller.

FIG. 3 illustrates one embodiment of a print controller 300 (also known as printer controller). In one embodiment, print controller 300 may comprise a one or a plurality of controllers (e.g., including printer controller 200, first control unit 2551 and second control unit 2552), where each controller may be implemented within the same location or different locations. As shown in FIG. 3, print controller 300 includes an interpreter module 312 (e.g., comparable to drawing unit 2300) that is operable to interpret, render, rasterize, or otherwise convert images of a print job into sheetside bitmaps. The interpreter module 312 is operable to interpret or render multiple raw sheetsides concurrently so that the rate of rendering substantially matches the rate of imaging of production print engines.

Halftoning module 313 is operable to represent the sheetside bitmaps as halftone patterns of ink. For example, halftoning module 313 may convert the image pels (also known as pixels) to halftone patterns for each color channel (e.g., for each of CMYK inks) for application of the inks to the paper 140. A halftone design may comprise a pre-defined mapping of input image pel gray levels to output drop sizes based on pel location.

Figure 5A:
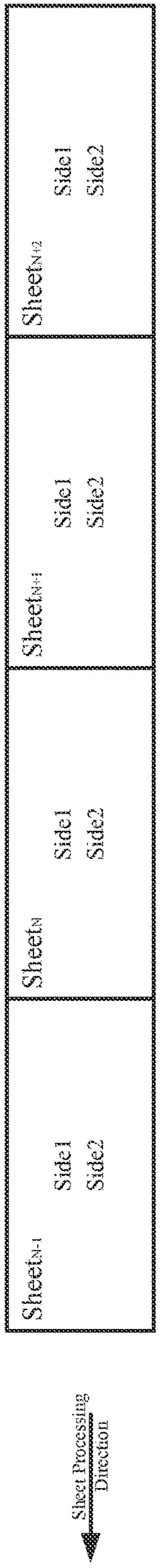
FIGS. 5A-5F illustrate embodiments of page sheets.

Print controller 300 also includes sheet queues 310 that comprise bitmap buffers that store bitmaps of print data that are to be printed at the print engines 110 and 120. FIG. 5A illustrates one embodiment of bitmap sheet images received at print controller 300 and queued for printing. Each bitmap sheet shown includes each of the corresponding color channel bitmap sheets. The bitmap sheets are sequentially processed for printing in the order shown and according to the sheet processing direction shown. As disclosed in FIG. 5A, the bitmap sheet images comprise Side1 and Side2 of $Sheet_{N-1}$-$Sheet_{N+2}$. In one embodiment, sheet queue 310A stores a set of bitmap sheets that are different from those stored at sheet queue 310B. In such an embodiment, sheet queue 310A stores Side1 of $Sheet_{N-1}$ $Sheet_{N+2}$, shown in FIG. 5C, that are to be printed at the first print engine 110. Similarly, sheet queue 310B stores Side2 of $Sheet_{N-1}$-$Sheet_{N+2}$, shown in FIG. 5E, that are to be printed at the second print engine 120.

Sheet conductors 320 facilitate the printing of stored sheet queue 310 bitmap data by the print engines onto the paper 140. For example, sheet conductor 320A facilitates the printing of Side1 sheets at the first print engine 110, while sheet conductor 320B facilitates the printing of Side2 sheets at the second print engine 120.

Splice interrupt module 350 is implemented to generate instructions that perform operations in response to detecting a web splice. In one embodiment, a web sensor 102 (e.g., any suitable sensor to detect splices based on differences, such as thickness, color, density, etc., between spliced paper and paper without a splice) is included along the paper path 128 at a suitable location to detect the occurrence of a web splice 144 in the paper 140. In such an embodiment, web sensor 102 generates a web splice signal in response to detecting the web splice 144 in paper 140 at the location of the web sensor 102. In a further embodiment, web sensor 102 is positioned at a sufficient distance upstream from the first print engine 110 to enable the web splice signal to be processed and the first print engine 110 to prepare for the arrival of the splice 144 (e.g., open the printhead gap 126) prior to the splice 144 reaching the first print engine 110. The pre-determined locations of print system 100 components (e.g., the web sensor, first print engine, second print engine, printheads 112, etc.) along the paper path 128 determines the web distances between these components. These web distances and the web speed are then used to determine the timing of various processes as will be explained below.

Figure 4:
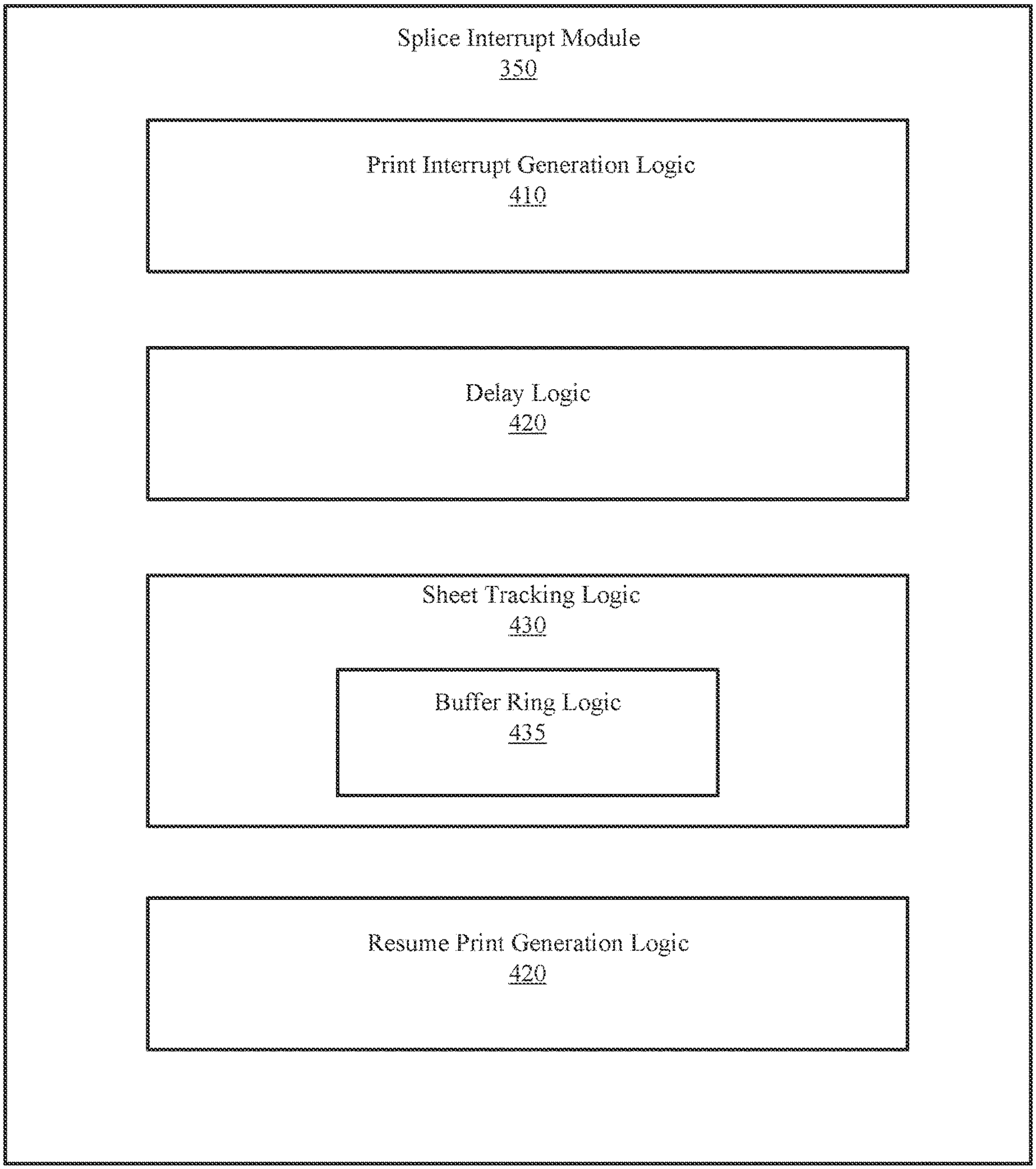
FIG. 4 illustrates one embodiment of splice interrupt module.

FIG. 4 illustrates one embodiment of splice interrupt module 350. Splice interrupt module 350 includes print interrupt generation logic 410 that generates the print interrupt instructions in response to receiving a web splice signal. In one embodiment, the print interrupt instructions include gap instructions that are transmitted to first print engine 110 and second print engine 120. In this embodiment, a first gap instruction is transmitted to the first print engine 110 that instructs the first print engine 110 to open the printhead gap 126 associated with the first print engine 110 (e.g., the first gap). Similarly, a second gap instruction is transmitted to the second print engine 120 that instructs the second print engine 120 to close the printhead gap 126 associated with second print engine 120 (e.g., the second gap).

Figure 6:
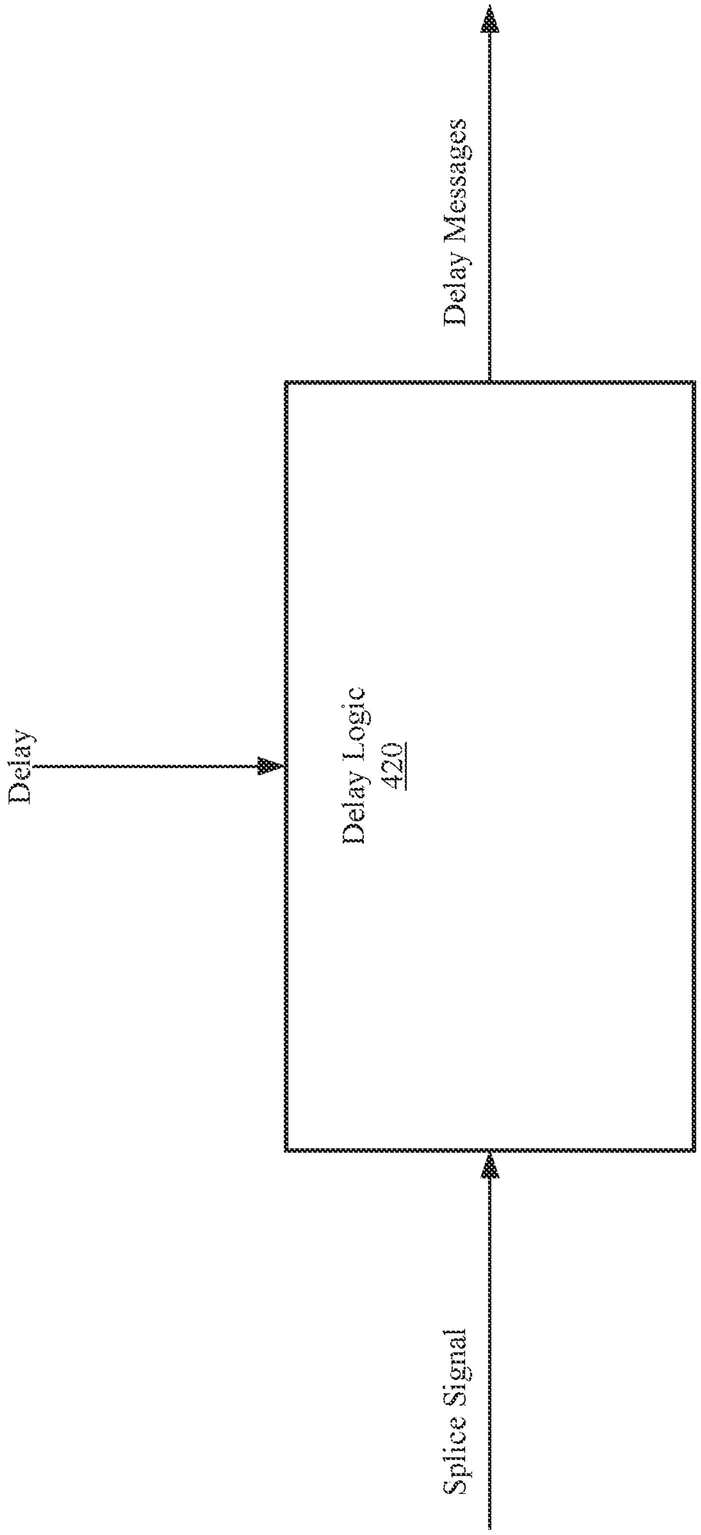
FIG. 6 illustrates one embodiment of delay logic.

In a further embodiment, the first and second gap instructions include delay messages to delay the first and second gap openings, respectively. FIG. 6 illustrates one embodiment of delay logic 420 implemented to generate the delay messages. Delay logic 420 comprises a programmable delay that may be implemented with hardware, firmware, software, or a combination. In one embodiment, the delay messages are generated based on the distance amount of the paper path 128 between the web sensor 102 and first print engine 110 and print speed (i.e., traveling speed of the paper 140 along the paper path 128). Thus, the delay time remains constant during printing (i.e., the print speed is controlled by the print controller 300 and typically does not change during printing to prevent print quality concerns). However, delay logic 420 may generate an updated delay time based upon detected changes to the print speed. Delay logic 420 may further generate the delay times accounting for the print system gap mechanism opening or closing cycle times where the cycle times may be predetermined.

According to one embodiment, a first delay message is generated and transmitted to the first print engine 110. The first delay message may include a set of delay times corresponding to an amount of time to deposit each color ink (e.g., CMYK) relative to the time the first color of ink was deposited. Thus, if the print engine delays the cessation of printing on the second and subsequent colors of ink by the corresponding delay time, the delay times ensure that at most one partial sheet is printed, because all colors stop printing in the same physical location on the page. In a further embodiment, the delay time to open the first gap may be a small, fixed number of lines (e.g., lines refer to the process direction resolution of the print engine) upon a determination that splice detection occurs within a few lines of a sheet side boundary.

However, there may be a limitation as to how precisely the printing of a given color can be interrupted within a sheet at a certain point in time. For example, considering a total uncertainty in time to stop printing be +/−M line times, the delay time to open the first gap is 2M line times upon a determination that splice detection occurs within M lines of a sheet side boundary. This ensures that interruption occurs cleanly within one sheet side and does not span multiple sheet sides. In a further embodiment, the total number of lines of the delayed gap opening is less than 200 lines at 1200 lines per inch process direction (e.g., vertical) resolution and less than 100 lines at 600 lines per inch process direction resolution.

A second delay message is also generated for transmission to the second engine 120. The second delay message includes a second delay time to prevent the second print engine 120 from opening the second gap until a time after the first gap has been opened. Accordingly, the second delay time corresponds to the paper path distance between the first print engine 110 and the second print engine 120, less the transit time of any partial sheet that was printed by engine 1. Thus, the partial sheet is printed only on one side and is not printed by engine 2.

In a further embodiment, delay messages may be generated and transmitted to additional components. For example, delay messages may be transmitted to post-processing device 170 and verification unit 180 (FIG. 1), as will be discussed in more detail below.

Referring back to FIG. 4, splice interrupt module 350 also includes sheet tracking logic 430 to track sheets printed prior to the first and second gap openings. In one embodiment, sheet tracking logic 430 identifies an interrupted (or paused) sheet (e.g., identify the sheet by a sheet ID) in response to receiving the web splice signal. In this embodiment, the interrupted sheet comprises the first sheet that will be printed after resuming printing, or the sheet that was only partially printed prior to or during the first gap opening at the first print engine 110. Sheet tracking logic 430 also identifies one or more unprinted sheet images (e.g., the interrupted sheet image and sheet bitmaps after the interrupted sheet) within the print job that were not printed (or not completely printed) prior to printing being interrupted.

In a further embodiment, the interrupted sheet is used to track a point at which printing is to be interrupted for the second gap opening at the second print engine 120. Based on the above-described second delay time, opening of the second gap occurs just prior to the start of the printing of the second side of the interrupted sheet. Thus, all four colors of the second print engine 120 are paused prior to the printing of the second side of the interrupted sheet. In yet a further embodiment, sheets may continue to be requested and received at sheet queue 310B prior to expiration of the second delay time.

In one embodiment, color planes are coordinated using buffer ring logic 435. In such an embodiment, buffer ring logic 435 may be replicated with a variable delay-after-splice parameter. In a further embodiment, splice detection may be considered a single exogenous event that is be used to stimulate identical buffer management logic for buffers of each color. As a result, interrupt and buffer-freeing delays may be different for each color.

Buffer ring logic 435 comprises sufficient memory to store a pre-determined length of bitmaps for each color of ink. In such an embodiment, buffer ring logic 435 stores each sheet's bitmap until it has been successfully inked by all colors of both print engines. In a further embodiment, failure of any color to ink a given sheet side within a predetermined temporal window may cause all colors of ink on both print engines to retain the associated bitmap. When a bitmap has been successfully inked by all colors on print engine 1, they are retained until print engine 2 inks the reverse side. Both print engines notify the print controller with the sheet side ID (e.g., sheet side identification) when they have completed inking all colors on a given print side.

The print controller 130 notifies both print engines that the front and back sheet side can be freed once both sides have been successfully inked by all colors on both engines. Both engines retain all bitmaps until they are notified by the print controller 130 that they are inked on both sides. Print engine 1 computes the second side ID number associated with each sheet ID that it completes (e.g., by adding 1 to the sheet side Id). Print engine 1 is aware of the last sheet side ID in the print job currently being printed, and will not wait for the second side if the side it has just finished is the last side in the job. When this occurs, both print engines free the associated bitmap memory for both colors of all sides.

In this way, sheet sides are freed in sequential order. New sheet sides transmitted to the engine are stored in an available buffer within the ring. The print engine will not request another sheet side bitmap from the print controller when there is no more room in the buffer ring logic 435. If this occurs, printing stops automatically. In other embodiments, print engine 1 and print engine 2 retain each sheet side inked until notified by the print controller that it is OK to free this sheet side. In such embodiments, print engine 1 does not compute the corresponding back sheet side id, and neither print engine frees any bit map until notified by print controller that it is OK to do so. Print controller 130 is aware of the last sheet side in the job and will notify both engines to free a sheet side as soon as both sides are completely inked by both engines, or as soon as the last sheet side is fully inked, whichever event comes first.

Additionally, interrupt for each color is delayed relative to earlier-printed colors in which buffer-freeing for each color occurs later for earlier printed colors. In yet a further embodiment, a single splice or interrupt event simultaneously interacting with all four colors stops printing at the same place on or before a particular sheet and suppresses freeing of this same sheet. Thus, color plane buffer rings will have been released and retained the same sheets.

In an alternative embodiment, color plane bitmaps may be stored as sets. In this embodiment, buffer ring logic 435 enables color buffers to be released by one process as a set in which the release does not occur until the last color on the second print engine 120 engine has been fully printed for the last line. Thus, print interrupt of individual colors within the engine continues to use delays between colors.

According to one embodiment, the print interrupt instructions generated by print interrupt generation logic 410 also include gap pass instructions that are transmitted to the first print engine 110 and the second print engine 120 upon determining that the splice 144 has passed the second print engine 120. Determining when the splice 144 has passed the second print engine 120 may be calculated based on relevant distance amount of the paper path 128 and the print speed. In one embodiment, the gap pass instructions provide instructions to close the first gap opening and the second gap opening. In such an embodiment, a gap pass instruction is generated upon receiving a gap pass signal that indicates that the web splice 144 has passed the second printhead gap. In a further embodiment, the gap pass instruction indicates that the first gap opening is to be closed prior to closing the second gap opening.

Resume print generation logic 420 generates resume print instructions upon receiving the gap pass signal. In one embodiment, the resume print instructions include the unprinted sheet images (and any sheet images that were only partially printed so that they may now be completely printed) identified at sheet tracking logic 430. In a further embodiment, the resume print instructions also include one or more flush sheet images inserted into the sheet queue 310A-310B ahead of the one or more unprinted sheet images within the print job. Accordingly, printing resumes once the flush sheets have been inserted and printed.

In yet a further embodiment, upon a determination that the interrupted first side sheet image printed by the first print engine was incompletely printed, the resume print instructions for the second print engine include a blank sheet followed by the second side of the sheet image corresponding to the interrupted sheet. The technical benefit of that is to match printed first sheet sides to the corresponding second sheet sides while minimizing printing partially printed sheet sides. Blank sheet sides may be readily recognized and processed accordingly by post-processing equipment as opposed to partially printed sheet sides that are more challenging for post-processing equipment to process.

In one embodiment, the resume print instructions include the second delay message to indicate that the second print engine 120 is not to begin printing until after the second delay time. As used herein, a flush sheet is sheet that includes markings printed by the print engines to avoid nozzle clogging due to inactivity. A flush sheet may include a flushing pattern that fits in the minimum sheet length and is repeated as many times as current sheet length allows.

In one embodiment, post-processing device 170 comprises a sheet cutter that is implemented to cut the continuous printed sheets into individual sheets. In such an embodiment, resume print generation logic generates the flush sheet images based on paper length and the post-processing device 170 properties, and transmits the flush sheet images to the print engines to be printed just prior to production printing being resumed.

Figure 7:
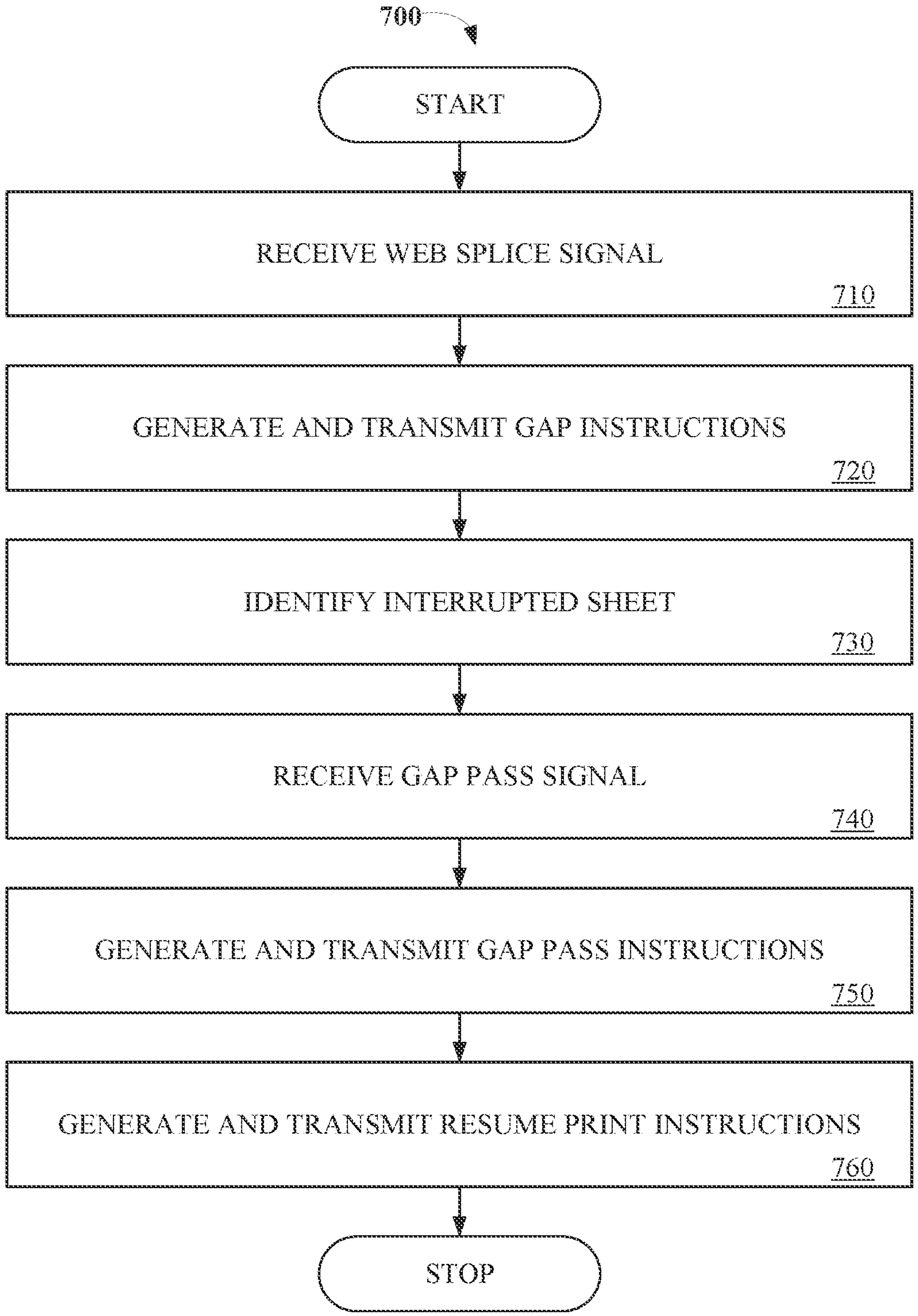
FIG. 7 is a flow diagram illustrating one embodiment of a splice interrupt process.

FIG. 7 is a flow diagram illustrating a process 700 for performing a splice pause. Process 700 may be performed by processing logic that may include hardware (e.g., circuitry, dedicated logic, programmable logic, microcode, etc.), software such as instructions run on a processing device, or a combination thereof. In one embodiment, process 700 is performed by print controller 300.

Process 700 begins at processing block 710 where a web splice signal is received (e.g., from web sensor 102). At processing block 720, the gap instructions are generated and transmitted. As discussed above, the gap instructions include delay messages transmitted to first print engine 110 and the second print engine 120, which facilitate the first gap opening at the first print engine 110 after a first delay time to deposit the last color ink and the second gap opening at the second print engine 120 after a second delay time after completion of the first gap opening.

At processing block 730, the interrupted sheet is identified, as well as the unprinted sheet images are identified. At processing block 740, a gap pass signal is received indicating that the web splice 144 has passed the second print engine 120. At processing block 750, gap pass instructions are generated and transmitted to facilitate the closing of the first gap opening and the second gap opening. At processing block 760, the resume print instructions are generated and transmitted to the first print engine 110 and the second print engine 120. As mentioned above, the resume print instructions include the identified unprinted sheet images, as well as the flush sheet images. Subsequently, printing is resumed at the first print engine 110 and the second print engine 120 beginning with the flush pages and then the first of the unprinted sheet images.

Figure 5B:
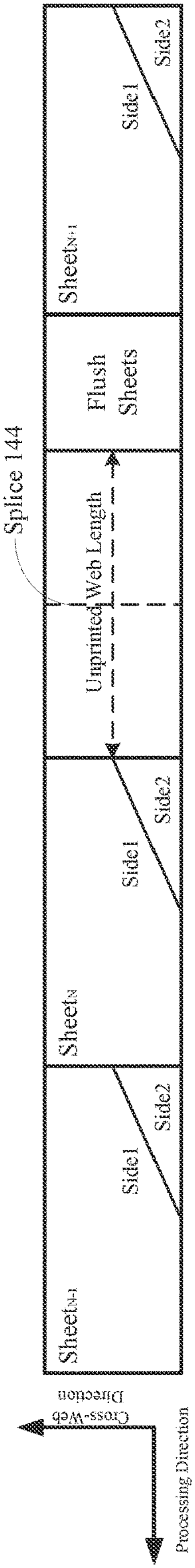
Figure 5C:
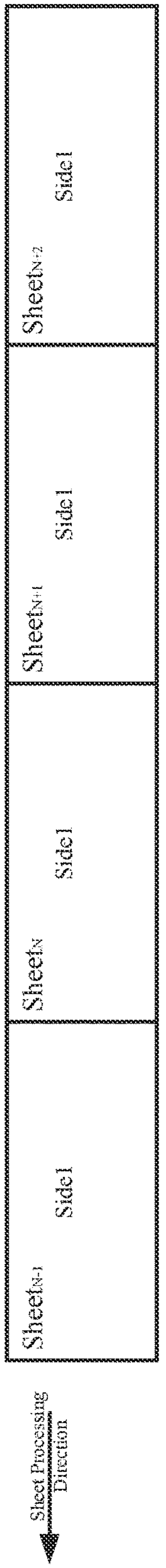
Figure 5D:
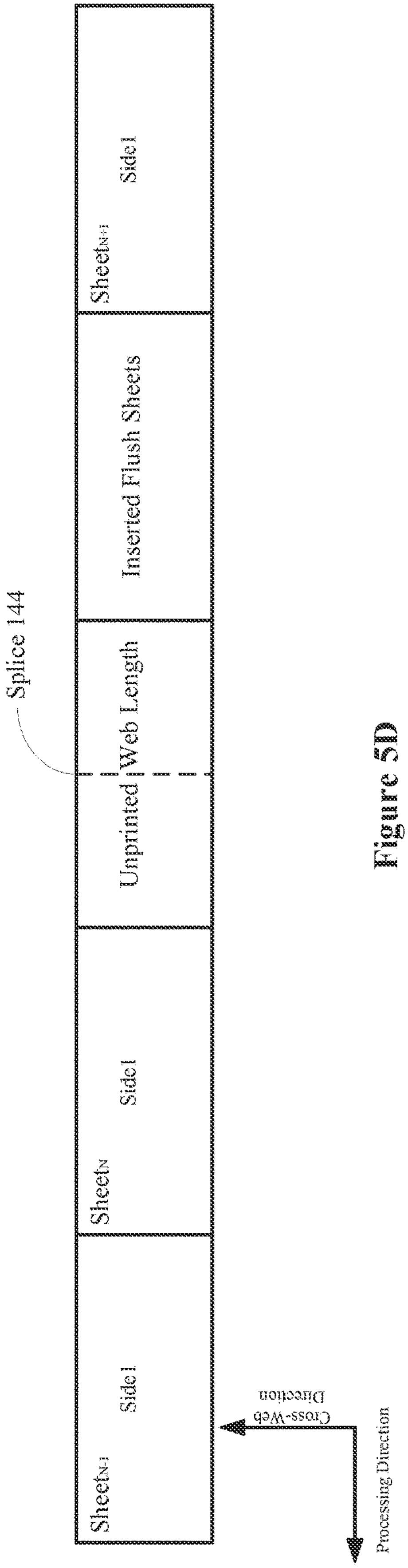
Figure 5E:
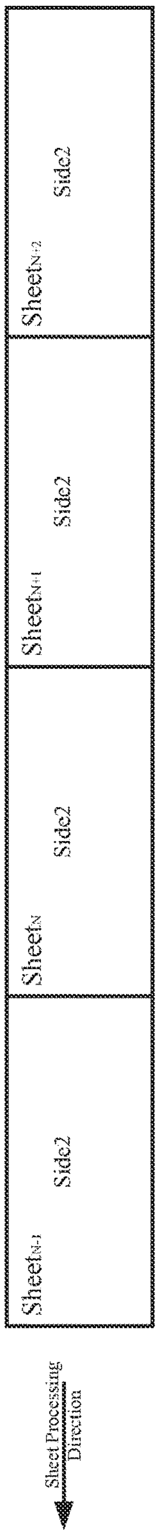
Figure 5F:
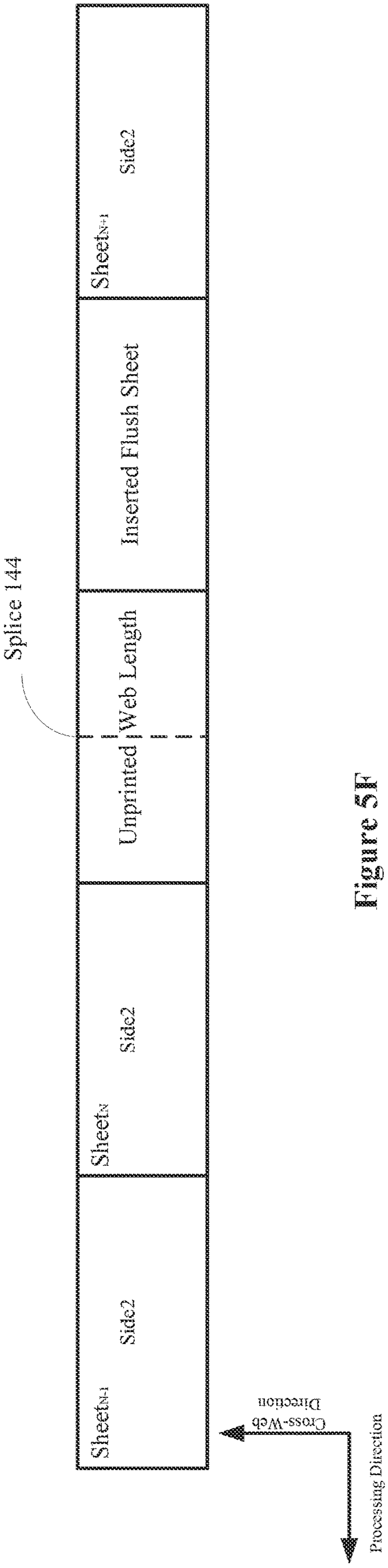
Figure 5G:
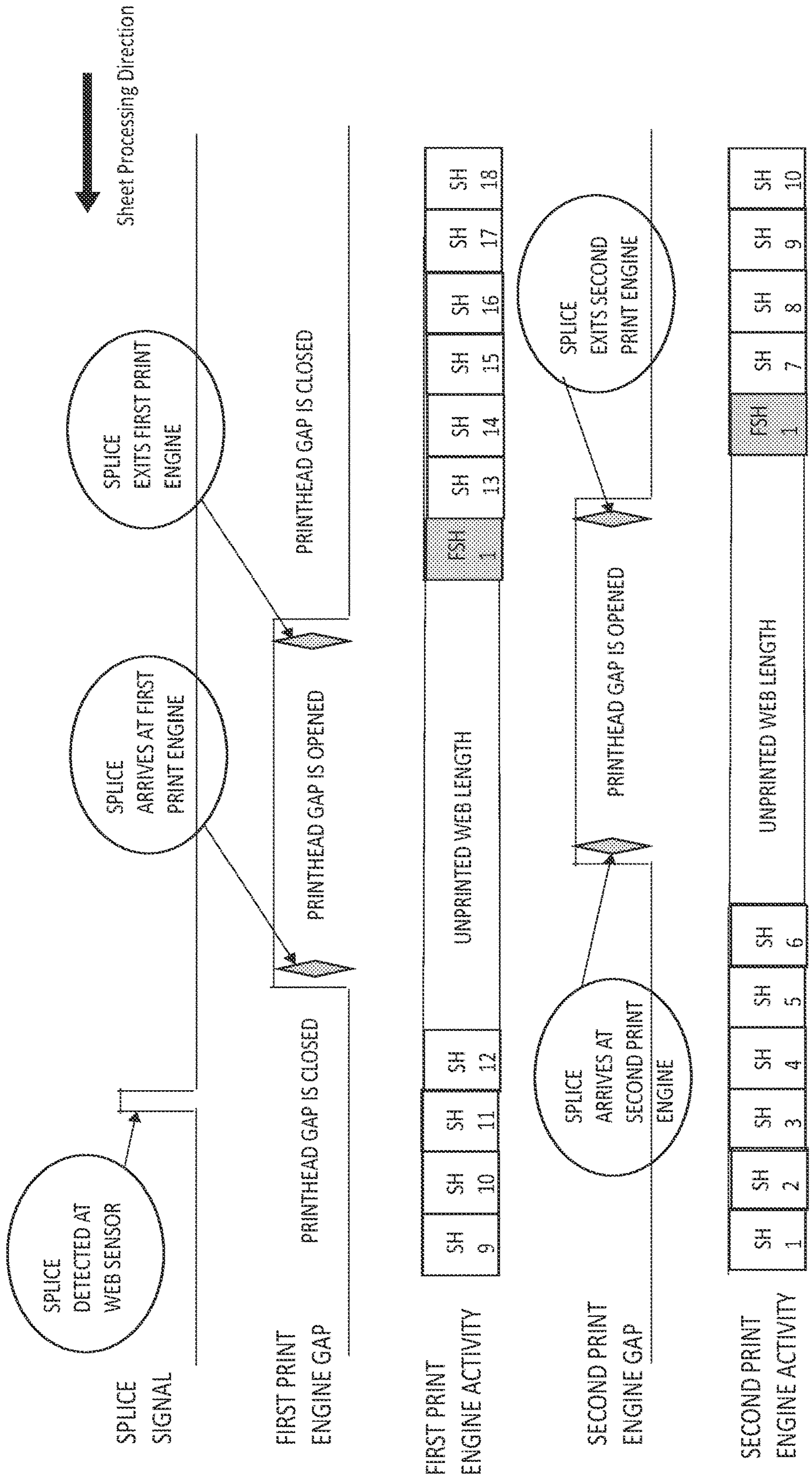
FIGS. 5G and 5H illustrate embodiments of event timing relationships during splice processing.

FIG. 5B illustrates one embodiment of processed sheets output from printing system 100. As shown in FIG. 5B, one or more flush sheets are inserted before (e.g., downstream of) $Sheet_{N+1}$ that represents the interrupted sheet following a splice 144, which is shown located in the unprinted web length. The processing direction (e.g., the web movement direction) and the cross-web direction are also shown for reference. Similarly, FIGS. 5D and 5F show the processed sheets output from the first print engine 110 and the second print engine 120, respectively, including the flush sheets printed before the interrupted sheet $Sheet_{N+1}$. Note that in FIGS. 5B-5F, the interrupted sheet is $Sheet_{N+1}$ FIG. 5G illustrates one embodiment of event timing relationships during splice processing for a print system, where SH # represents a production print sheet number (e.g., sheet ID), FSH # represents flushing sheet number and the horizontal axis is time. The first print engine prints one side (e.g., a first side) of sheets SH # and FSH # while the corresponding other side (e.g., a second side) of SH # and FSH # is printed by the second print engine. For illustrative purposes, the paper path location difference between first print engine and the second print engine can be seen as equal to 8 sheet lengths (e.g., the first print engine is printing first side of SH9 when the second print engine is printing second side of SH1).

As shown in FIG. 5G, the printhead gap opening/closing and printing stop/resume event times are different for each print engine as this allows technical benefits such as minimized unprinted web length in response to a splice. Note that SH13 is the interrupted sheet on the first print engine and the first sides of both SH12 and SH13 are each printed complete and one time on the first print engine. On the second print engine, SH7 is the interrupted sheet and the second sides of both SH6 of SH7 are each printed complete and one time. Further, the second print engine prints each of the corresponding second sides of SH12 and SH13 (not shown) completely and once.

Figure 5H:
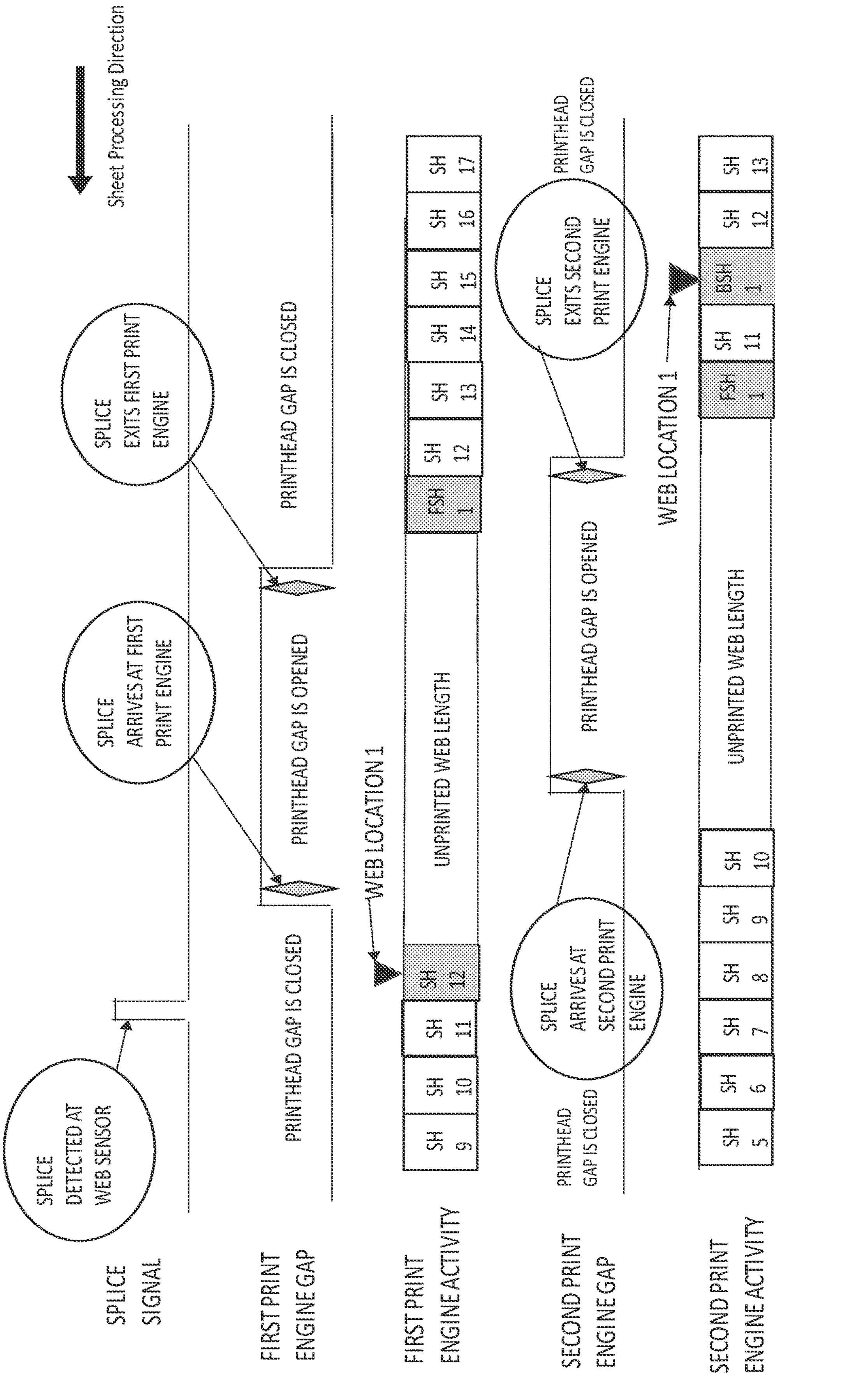

FIG. 5H illustrates another embodiment of event timing relationships during splice processing for a print system. For illustrative purposes, the paper path location difference between the first print engine and the second print engine can be seen as equal to 4 sheet lengths (e.g., the first print engine is printing first side of SH9 when the second print engine is printing second side of SH5). In this embodiment, SH12 is the interrupted sheet on the first print engine and the first side of SH12 is partially printed before printing is stopped.

When printing resumes on the first print engine, the first print engine prints the first side of SH12 complete (e.g., complete and after the first side of FSH1). SH11 is the interrupted sheet on the second print engine and the second side of SH11 is printed complete and once by the second print engine. Additionally, a blank first sheet side BSH1 has been inserted between second sheet sides SH11 and SH12 on the second print engine. This second side of BSH1 corresponds to the partially printed first side of SH12. This is further noted by the two web location markers shown as web location 1 in FIG. 5H that indicate the same location along the length of the physical web on opposing sides of the web.

After the second side of BSH1 prints, the second side of SH12 completely prints. One technical benefit is that when the first print engine partially prints an interrupted sheet in response to a splice, the second print engine prints a corresponding blank side while maintaining first side to second side correspondence integrity on the web. Post-processing equipment may readily detect this partially printed sheet through various means (e.g., based on a detected absence of a second side printer mark such as stack, eject or verification or based on detecting that the second side is totally blank, etc.) and process it accordingly (e.g., remove and dispose the partially printed sheet) while subsequent sheets are in proper order and properly printed.

As mentioned above, a verification unit 180 may be implemented to record print quality defects (e.g., defects from faulty print marking or physical defects in the paper). Verification unit 180 may comprise an image capturing device, such as one or more cameras, to capture images of the printed paper 140 and provide measurements (e.g., reflectance, intensity, etc.) of the images for each of one or more color bands.

In embodiments, splice interrupt module 350 generates a verification message that is transmitted to verification unit 180 to indicate that verification unit 180 is to discontinue print verification. The verification message may include a delay message generated at delay logic 420 that indicates that the verification unit 180 is to discontinue print verification after a delay (e.g., the paper path length to first color of the first print engine 110 times paper speed).

Upon receiving the verification message, verification unit 180, after the delay, ignores all pages after the delay. Alternatively, verification unit 180 may ignore all pages without either a stack mark or eject mark. In this embodiment, a stack mark or eject mark will be placed on the side of the second print engine 120, while the second print engine 120 pauses printing before the start of the interrupted/paused sheet. Therefore, interrupted sheets and lengths of blank paper are ignored by verification unit 180.

In some embodiments, the splicing unit 190 may be included to provide warning of a splice. In such embodiments, splicing unit 190 transmits the web splice signal that is received at splice interrupt module 350, which performs the operations described above. Due to the physical geometry, the web splice signal from the splicing unit 190 (or a web sensor 102 placed upstream from a paper web buffer) would be generated sufficiently far in advance of the splice 144 arriving at the first print engine 110 to allow complete sheets to print before opening the first gap. In this embodiment, the print interrupt instructions indicating the sheet side images to be printed at the first print engine 110 are generated. Subsequently, printing of all colors is stopped in a coordinated manner at the end of the next full sheet side prior to opening the first gap. In other words, there would be no interrupted sheets that are partially printed. Thus, printing is resumed with the next sheet side upon receiving a resume print instruction.

The second first print engine 120, upon receiving the print interrupt instructions after a certain sheet side image, waits until after that sheet side has been printed and stops printing all colors in a coordinated manner. Subsequently, the second gap is opened. Again, printing is resumed with the next sheet side upon receiving a resume print instruction.

Figure 8:
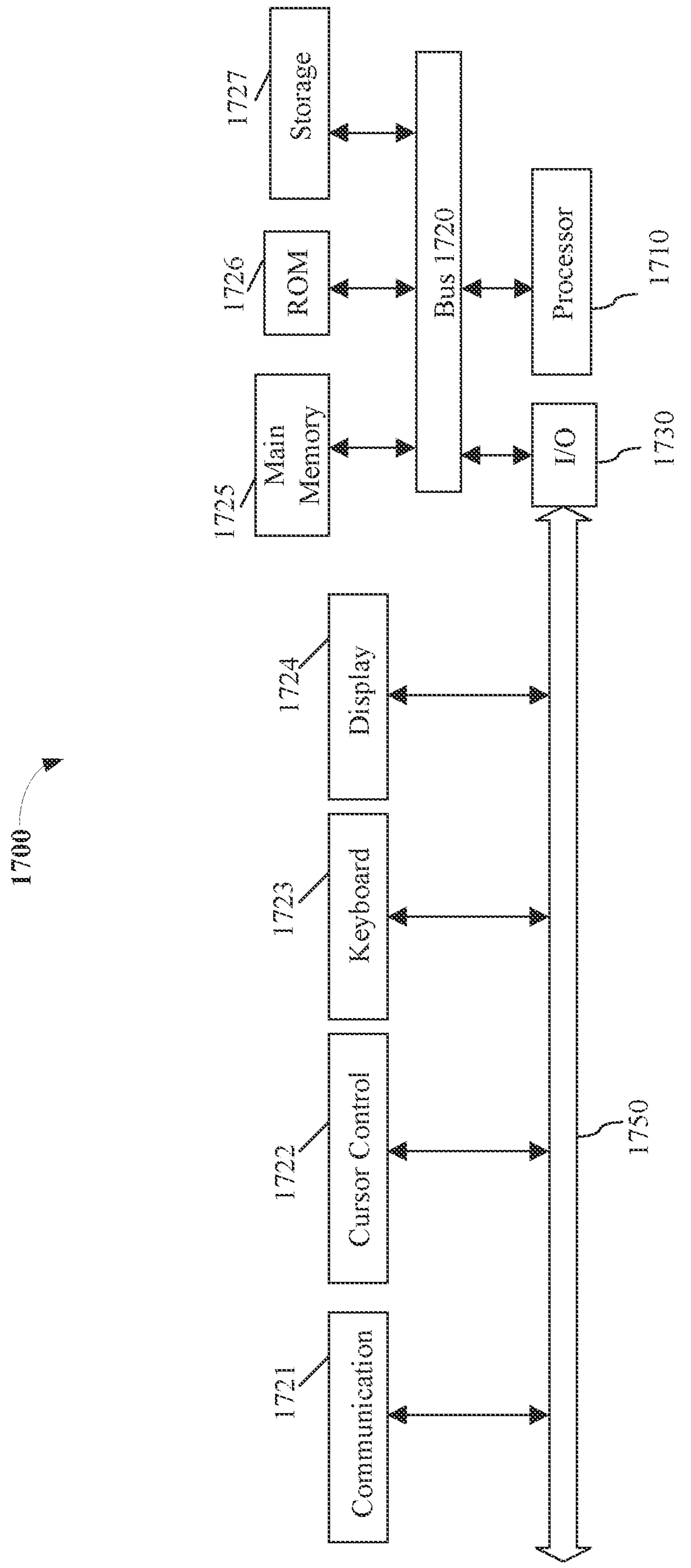
FIG. 8 illustrates one embodiment of a computer system.

FIG. 8 illustrates a computer system 1700 on which printing system 100, printer controller 200, print controller (s) 300, first engine control unit 2551, second engine control unit 2552 and/or splice interrupt module 350, may be implemented. Computer system 1700 includes a system bus 1720 for communicating information, and a processor 1710 coupled to bus 1720 for processing information.

Computer system 1700 further comprises a random access memory (RAM) or other dynamic storage device 1745 (referred to herein as main memory), coupled to bus 1720 for storing information and instructions to be executed by processor 1710. Main memory 1725 also may be used for storing temporary variables or other intermediate information during execution of instructions by processor 1710. Computer system 1700 also may include a read only memory (ROM) and or other static storage device 1726 coupled to bus 1720 for storing static information and instructions used by processor 1710.

A data storage device 1727 such as a magnetic disk or optical disc and its corresponding drive may also be coupled to computer system 1700 for storing information and instructions. Computer system 1700 can also be coupled to a second I/O bus 1750 via an I/O interface 1730. A plurality of I/O devices may be coupled to I/O bus 1750, including a display device 1724, an input device (e.g., an alphanumeric input device 1723 and or a cursor control device 1722). The communication device 1721 is for accessing other computers (servers or clients). The communication device 1721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising one or more print controllers to generate print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at the first print engine and to open a second printhead gap at the second print engine, control printing of the first side sheet image on a first side of a web at a first print engine based on the print interrupt instructions, control printing of the second side sheet image to a second side of the web at a second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

Example 2 includes the subject matter of Example 1, wherein the second side of the sheet image corresponding to the interrupted first side sheet image is set to blank upon a determination that the interrupted first side sheet image was incompletely printed by the first print engine prior to stopping printing.

Example 3 includes the subject matter of Examples 1 and 2, wherein the interrupted first side sheet image that was incompletely printed is reinserted to be printed at the first print engine.

Example 4 includes the subject matter of Examples 1-3, wherein the gap instructions to open the first printhead gap prior to opening a second printhead gap at the second print engine.

Example 5 includes the subject matter of Examples 1-4, wherein the one or more controllers generate a delay included in the gap instructions to indicate a delay time for opening the second printhead gap after opening the first printhead gap.

Example 6 includes the subject matter of Examples 1-5, wherein the print interrupt instructions further comprise gap pass instructions to close the first printhead gap prior to closing the second printhead gap.

Example 7 includes the subject matter of Examples 1-6, wherein the one or more controllers generate resume print instructions, wherein the resume print instructions comprise determined interrupt sheet images for each print engine to print after the web splice has exited each corresponding print engine.

Example 8 includes the subject matter of Examples 1-7, wherein the resume print instructions comprise one or more flush sheet images inserted to print prior to the interrupt sheet images within the print job.

Example 9 includes the subject matter of Examples 1-8, further comprising a first sensor to generate the web-splice signal.

Example 10 includes the subject matter of Examples 1-9, further comprising a print verification system.

Example 11 includes the subject matter of Examples 1-10, wherein the print controller generates a verification message to indicate that the print verification system is to discontinue print verification.

Example 12 includes the subject matter of Examples 1-11, wherein the print controller transmits the verification message after a delay.

Example 13 includes the subject matter of Examples 1-12, further comprising a printer, including the first print engine and the second print engine.

Some embodiments pertain to Example 14 that includes at least one computer readable medium having instructions stored thereon, which when executed by one or more processors, cause the processors to generate print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at the first print engine and to open a second printhead gap at the second print engine, control printing of the first side sheet image on a first side of a web at a first print engine based on the print interrupt instructions, control printing of the second side sheet image to a second side of the web at a second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

Example 15 includes the subject matter of Example 14, wherein the second side of the sheet image corresponding to the interrupted first side sheet image is set to blank upon a determination that the interrupted first side sheet image was incompletely printed by the first print engine prior to stopping printing.

Example 16 includes the subject matter of Examples 14 and 15, wherein the interrupted first side sheet image that was incompletely printed is reinserted to be printed at the first print engine.

Example 17 includes the subject matter of Examples 14-16, wherein the gap instructions to open the first printhead gap prior to opening a second printhead gap at the second print engine.

Some embodiments pertain to Example 18 that includes a method comprising generating print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at the first print engine and to open a second printhead gap at the second print engine, controlling printing of the first side sheet image on a first side of a web at a first print engine based on the print interrupt instructions, controlling printing of the second side sheet image to a second side of the web at a second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

Example 19 includes the subject matter of Example 18, wherein the second side of the sheet image corresponding to the interrupted first side sheet image is set to blank upon a determination that the interrupted first side sheet image was incompletely printed by the first print engine prior to stopping.

Example 20 includes the subject matter of Examples 18 and 19, wherein the interrupted first side sheet image that was incompletely printed is reinserted to be printed at the first print engine.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:

one or more print controllers to:

generate print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at a first print engine and to open a second printhead gap at a second print engine;

control printing of the first side sheet image on a first side of a web at the first print engine based on the print interrupt instructions; and control printing of the second side sheet image to a second side of the web at the second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

2. The system of claim 1, wherein the second side of the sheet image corresponding to the interrupted first side sheet image is set to blank upon at the determination that the interrupted first side sheet image was incompletely printed by the first print engine prior to stopping printing.

3. The system of claim 2, wherein the interrupted first side sheet image that was incompletely printed is reinserted to be printed at the first print engine.

4. The system of claim 1, wherein the gap instructions to open the first printhead gap prior to opening the second printhead gap at the second print engine.

5. The system of claim 4, wherein the one or more controllers generate a delay included in the gap instructions to indicate a delay time for opening the second printhead gap after opening the first printhead gap.

6. The system of claim 5, wherein the print interrupt instructions further comprise gap pass instructions to close the first printhead gap prior to closing the second printhead gap.

7. The system of claim 1, wherein the one or more controllers generate resume print instructions, wherein the resume print instructions comprise determined interrupt sheet images for each print engine to print after the web splice has exited each corresponding print engine.

8. The system of claim 7, wherein the resume print instructions comprise one or more flush sheet images inserted to print prior to the interrupt sheet images within the print job.

9. The system of claim 1, further comprising a first sensor to generate the web-splice signal.

10. The system of claim 1, further comprising a print verification system.

11. The system of claim 1, wherein the print controller generates a verification message to indicate that the print verification system is to discontinue print verification.

12. The system of claim 11, wherein the print controller transmits the verification message after a delay.

13. The system of claim 1, further comprising a printer, including:

the first print engine; and the second print engine.

14. At least one computer readable medium having instructions stored thereon, which when executed by one or more processors, cause the processors to:

generate print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at a first print engine and to open a second printhead gap at a second print engine;

control printing of the first side sheet image on a first side of a web at the first print engine based on the print interrupt instructions; and control printing of the second side sheet image to a second side of the web at the second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

15. The computer readable medium of claim 14, wherein the second side of the sheet image corresponding to the interrupted first side sheet image is set to blank upon the determination that the interrupted first side sheet image was incompletely printed by the first print engine prior to stopping printing.

16. The computer readable medium of claim 15, wherein the interrupted first side sheet image that was incompletely printed is reinserted to be printed at the first print engine.

17. The comupter readable medium of claim 14, wherein the gap instructions to open the first printhead gap prior to opening a second printhead gap at the second print engine.

18. A method comprising:

generating print interrupt instructions in response to receiving a web splice signal indicating that a web splice on a web print medium has been detected, wherein the print interrupt instructions indicate a first side sheet image and a second side sheet image within a print job to pause prior to stopping printing, wherein the print interrupt instructions comprise gap instructions to open a first printhead gap at a first print engine and to open a second printhead gap at a second print engine;

controlling printing of the first side sheet image on a first side of a web at the first print engine based on the print interrupt instructions; and controlling printing of the second side sheet image to a second side of the web at the second print engine based on the print interrupt instructions, wherein the print interrupt instructions are generated based on a determination of an interrupted first side sheet image to be paused prior to opening the first printhead gap and a determination of an interrupted second side sheet image to be paused prior to opening the second printhead gap.

19. The method of claim 18, wherein the second side of the sheet image corresponding to the interrupted first side sheet image is set to blank upon the determination that the interrupted first side sheet image was incompletely printed by the first print engine prior to stopping.

20. The method of claim 19, wherein the interrupted first side sheet image that was incompletely printed is reinserted to be printed at the first print engine.

* * * * *